Patented Jan. 5, 1932

1,839,950

UNITED STATES PATENT OFFICE

SIDNEY M. CADWELL, OF LEONIA, AND LUDWIG MEUSER, OF BERGENFIELD, NEW JERSEY, ASSIGNORS TO THE NAUGATUCK CHEMICAL COMPANY, OF NAUGATUCK, CONNECTICUT, A CORPORATION OF CONNECTICUT

PROCESS FOR TREATING RUBBER AND PRODUCTS OBTAINED THEREBY

No Drawing.   Application filed February 15, 1927.   Serial No. 168,463.

This invention relates to a process for treating rubber, more particularly to a process for retarding deterioration of rubber, and to the products obtained thereby.

In the commercial use of rubber a serious trouble encountered is the deterioration in the desirable qualities of the rubber, such as elasticity, tensile strength, etc., caused by aging.

An object of the present invention is to provide an improved process for retarding the deterioration of rubber caused by aging.

Another object is to provide a process for retarding the deterioration of rubber which is applicable to rubber in many forms and under varying conditions.

A further object is to provide a process of the above character by which discoloration of the resulting product is avoided.

A further object is to provide a rubber having improved aging qualities.

Additional objects will appear from the detailed disclosures.

The invention consists broadly in adding to rubber a substance comprising the group $X-C{\equiv}N$, under the conditions hereinafter set forth.

The invention is applicable to solid rubber, either uncompounded, vulcanizable or vulcanized, to rubber in the form of cements or doughs, and to rubber in the form of latex, either natural or artificial, unvulcanized or vulcanized. It is also applicable to synthetic rubbers and to balata, gutta percha, and similar rubber-like materials. The term "rubber" therefore when used in the specification and claims without qualification, is to be interpreted in a broad sense.

In carrying out the invention, the age retarding material may be added to the rubber in various manners. For instance if it is to be added to solid rubber in unvulcanized form, either uncompounded or compounded, it may be directly incorporated on the mixing mill, or it may be first compounded with some inert material such as stearic acid and added in this form to the rubber on the mixing mill, or it may be mixed with rubber latex or dissolved in water and then added on the mill. If it is to be applied to vulcanized rubber, thin sheets of the latter may be dipped, brushed, or otherwise coated with the age retarder if in liquid form. The retarder may be dissolved in a suitable solvent and then applied to the rubber. When the retarder is to be added to latex, either vulcanized or unvulcanized, if the retarder is water soluble, it may be directly added or added in the form of a water solution, while if it is insoluble in water but soluble in organic or other solvents it may be dissolved in these and then emulsified and added, while if in the form of an insoluble solid, it may be added in the form of a suspension. The above is merely illustrative of various ways by which various age retarders comprised in the invention may be added to various forms of rubber.

The type formula includes any compound comprising the group $X-C{\equiv}N$, where $X$ may be any non-carbonaceous element, and may be linked to other elements or groups, and where the compound as a whole does not comprise a metallic element which forms two or more stable chlorides.

The following compounds, among others having the type formula, may be used as retarders of aging in carrying out the process.

Where X is nitrogen:

| | |
|---|---|
| Calcium cyanamide | CaNCN |
| Phenyl cyanamide | $C_6H_5HNCN$ |
| Zinc cyanamide | ZnNCN |
| Dicyandiamide | $NH_2$<br>$\|$<br>$C-NH$<br>$\|$<br>$HNC{\equiv}N$ |
| Dinormalbutylcyanamide | $(C_4H_9)_2NCN$ |
| Cyanamide | $H_2NCN$ |

Where X is sulphur:

| | |
|---|---|
| Ammonium thiocyanate | $NH_4SCN$ |
| Potassium thiocyanate | KSCN |
| Zinc thiocyanate | $Zn(SCN)_2$ |
| Ethyl sulphocyanacetate | $C_2H_5OCCH_2SCN$<br>$\|\|$<br>$O$ |
| Calcium thiocyanate | $Ca(SCN)_2$ |
| Magnesium thiocyanate | $Mg(SCN)_2$ |
| Lead thiocyanate | $Pb(SCN)_2$ |
| Barium thyocyanate | $Ba(SCN)_2$ |
| Sulphocyanacetone | $CH_3CCH_2SCN$<br>$\|\|$<br>$O$ |
| Guanidine thiocyanate | $NH_2$<br>$\|$<br>$C-NH$<br>$\|$<br>$NH_2SCN$ |

Thiocyanate of the acid condensate of acetaldehyde and aniline
Thiocyanate of triethyltrimethylenetriamine Where X is selenium:
- Lead selenocyanate — Pb(SeCN)$_2$
- Potassium selenocyanate — KSeCN Where X is tellurium
- Potassium tellurocyanate — KTeCN Where X is oxygen
- Potassium cyanate — KOCN Where X is metallic, subject to the limitation above noted
- Potassium cyanide — KCN
- Potassium zinc cyanide — K$_2$Zn(CN)$_4$
- Lead cyanide — Pb(CN)$_2$
- Potassium cadmium cyanide — K$_2$Cd(CN)$_4$
- Potassium nickel cyanide — K$_2$Ni(CN)$_4$ As an example of the process a rubber compound was mixed on the mill as follows:

```
100   parts rubber
 10   parts zinc oxide
  3   parts sulphur
  .75 parts stearic acid compound of triethyltrimethylenetriamine
  5   parts dicyandiamide
```

The resulting mix was then vulcanized for 60 min. at 40 lbs. steam pressure, and an aging test gave the following results:

```
Blank green................................. 3545 lbs. tensile
Blank aged 40 hrs. @ 212° F.................. 1545 lbs. tensile
Dicyandiamide green.......................... 4185 lbs. tensile
Dicyandiamide aged 40 hrs. @ 212° F.......... 2600 lbs. tensile
```

A stock of this composition does not discolor either before or after aging. The dicyandiamide is relatively inexpensive, non-toxic and quite stable. In the above mix the dicyandiamide may be replaced by 5 parts of ammonium thiocyanate. The above compound using ammonium thiocyanate was given an aging test in the sun. In this test pieces of the vulcanized stock are bent double and exposed to the sun to determine if cracking develops. Of eleven pieces containing the thiocyanate only one developed a rather small crack, while of twenty similar blanks containing no thiocyanate only one failed to crack. In similar tests dinormal butyl cyanamide also prevented cracking of the stock. If desired a master batch may be mixed of rubber 80 parts and ammonium thiocyanate 20 parts, and then added to other rubber compounds in desired proportions.

As another example a standard inner tube stock and a similar stock to which five parts of dicyandiamide had been added on the mixing mill were vulcanized in the usual way, and then aged side by side at 212° F. with the following results:

|  | Green | After 16 hrs. | After 64 hrs. | After 88 hrs. |
|---|---|---|---|---|
| Blank | 3095 | 2065 | 134 | 101 |
| Dicyandiamide 5 parts | 2875 | 2785 | 1390 | 570 |

As a further example a stock was compounded as follows:

```
100 parts rubber
  2 parts zinc oxide
  2 parts sulphur
  2 parts oxynormal butyl thiocarbonic acid disulphide
```

This stock was vulcanized in aniline vapor, and then dipped into a benzol solution of the thiocyanate of the acid condensate of acetaldehyde and aniline, with resulting improved aging characteristics in the rubber.

As a further application of the invention 5 parts ammonium thiocyanate were added to 100 parts of gutta percha or balata, and imparted improved aging qualities to these materials.

As another example, illustrating the application of the invention to rubber in the form of latex, a mix was made up of 100 parts rubber, as ammonia treated latex of normal concentration, and 5 parts of ammonium thiocyanate, added as a water solution. The above compound may be utilized in any desired manner for the direct manufacture of rubber articles such as impregnation of fabric, cords, etc., or the rubber may be recovered in any suitable manner as by dehydrating for the purpose of obtaining a solid rubber having much improved aging characteristics. Potassium thiocyanate may be used instead. Dicyandiamide may be used to advantage in the same way.

As a further example illustrating the application of the invention to latex, 100 parts rubber, as vulcanized latex, may be mixed with an aqueous solution 5 parts ammonium thiocyanate. The vulcanized latex may be made in any suitable manner, for example by using:

```
100 parts rubber as ammonia free latex,
  1 part oxy normal butyl thiocarbonic acid disulphide,
  1 part dibenzylamine
  2 parts zinc oxide
  2 parts sulphur
```

The following procedure may be used in incorporating the ingredients: The oxy normal butyl thiocarbonic acid disulphide and the dibenzylamine are each dissolved in an organic solvent, such as solvent naphtha, and aqueous dispersions then made of the solutions. These dispersions are then added to the latex. The zinc oxide and sulphur are formed into a thin cream with water and glue and then added to the latex. The latex compound will vulcanize in about two weeks at 70° F., or instead the vulcanization may be hastened by heating after the compounded latex has stood for some time at ordinary temperatures. This cured latex compound, after addition of the age retarder, may also be directly applied in the making of rubber articles, or the vulcanized rubber may be recovered from the latex in any suitable manner as by desiccating. As before stated, where the age retarder to be used is water insoluble, it may be added to the latex in the form of a water suspension or it may be dissolved in a suitable solvent and then dispersed to form an emulsion. The latex, whether unvulcanized or vulcanized, may be in any concentration suitable for the purpose in mind.

The following other compounds, when added to vulcanized latex, have been found to impart improved aging qualities to the resulting rubber: Guanidine thiocyanate, potassium cyanate, potassium thiocyanate, potassium selenocyanate, potassium tellurocyanate, potassium zinc cyanide, and potassium nickel cyanide.

Certain of the compounds mentioned, such as dicyandiamide, thiocyanate of triethyltrimethylenetriamine, calcium cyanamide, etc. have a definite accelerating action on vulcanization in addition to their age resisting properties, and dicyandiamide in particular may be used as an accelerator per se or in combination with other accelerators such as the acetaldehyde aniline and heptaldehyde aniline condensates set forth in Cadwell Patent No. 1,417,970, or the stearic acid addition product of triethyltrimethylenetriamine set forth in patent to Bradley and Cadwell, No. 1,444,865. A white shoe upper stock was made up using dicyandiamide as the accelerator, and when cured this stock gave a better tensile and a better aged tensile than the accelerator ordinarily employed.

Certain of the thiocyanate compounds also retard ordinary vulcanization to some extent, and hence are more or less unsuitable when used in this manner. Such compounds may be used, however, to impart age resisting qualities to unvulcanized rubber goods or to sulphur chloride cured rubber. For example, zinc, lead, barium, magnesium and calcium thiocyanates may all be used with sulphur chloride cured goods, the age resister being milled into the stock in the usual way before the cure. The zinc thiocyanate may in some cases be also used in stocks vulcanized by ordinary heat curing methods.

As an example showing the use of the invention with sulphur chloride cured goods the following is given:

Pale crêpe rubber 100 parts was mixed on the mill with lead thiocyanate 5 parts and calendered to a thickness of .008 in., after which the stock was cured by dipping in a benzol solution of sulphur chloride. This stock when aged at 212° F. along with a blank showed greatly improved aging results over the blank, and did not discolor either before or after aging.

As an example showing the use of zinc thiocyanate in heat curing the following is given:

```
100 parts rubber
 10 parts zinc oxide
  3 parts sulphur
 10 parts litharge
  5 parts zinc thiocyanate
```

The above materials were mixed on the mill in the usual manner and cured in a mold at 40 lbs. steam pressure. The stock was then aged at 212° F. alongside a blank containing no thiocyanate with the following results:

|  | Green | Aged 16 hrs. @ 212° F. |
|---|---|---|
| With thiocyanate | 1920 | 1290 |
| Without thiocyanate | 2265 | 420 |

It will be seen that by our invention an age resister may be incorporated with rubber and similar materials in various forms, many of the compounds are relatively cheap, and it is possible to obtain an age resisting rubber without discoloration of the latter either before or after vulcanization. Sulphur chloride cured goods are notably poor in aging quality, and by the use of my invention this defect is obviated. In this case ammonium is to be understood as being a hypothetical metal.

With the above disclosure it is obvious that numerous modifications will suggest themselves to those skilled in the art and it is therefore not desired to limit the invention otherwise than as set forth in the appended claims.

Having thus described our invention what we claim and desire to protect by Letters Patent is:

1. Process for retarding deterioration by aging in rubber which consists in adding to rubber prior to vulcanization a compound comprising the group X—C≡N, where X is an element of the sulphur group and linked to a metal or an organic group, and where the compound as a whole does not comprise a metallic element which forms two or more stable chlorides.

2. Process for retarding deterioration by aging in rubber which consists in adding to rubber prior to vulcanization a compound comprising the group S—C≡N, where S is linked to a metal or an organic group, and where the compound as a whole does not comprise a metallic element which forms two or more stable chlorides.

3. Process for retarding deterioration by aging in rubber which consists in adding to rubber ammonium thiocyanate.

4. Process for retarding deterioration by aging in rubber which consists in adding to latex a compound containing the group X—C≡N, where X may be an element of the sulphur group and may be linked to other elements or groups, and where the compound as a whole does not comprise a metallic element which forms two or more stable chlorides.

5. Process for retarding deterioration by aging in rubber which consists in adding to rubber latex ammonium thiocyanate.

6. Process for retarding deterioration by aging in rubber which consists in adding to rubber latex a cyanate containing an alkali.

7. As a new composition of matter, rubber combined prior to vulcanization with an age resister comprising the group X—C≡N, where X is an element of the sulphur group, and may be linked to other elements or groups, and where the compound as a whole does not comprise a metallic element which forms two or more stable chlorides.

8. As a new composition of matter, rubber combined with ammonium thiocyanate as an age resister.

9. As a new composition of matter, rubber combined with a cyanate of an alkali as an age resister.

10. As a new composition of matter, latex containing as an age resister a compound comprising the group $X-C\equiv N$, where X may be an element of the sulphur group, and may be linked to other elements or groups, and where the compound as a whole does not comprise a metallic element which forms two or more stable chlorides.

11. As a new composition of matter latex containing as an age resister ammonium thiocyanate.

12. As a new composition of matter latex containing as an age resister a cyanate containing an alkali.

13. A process of treating rubber which comprises incorporating with rubber an accelerator of vulcanization and an age-resister compound having the general formula $R-X-C\equiv N$ where X is N or an element of the sulphur group and R is an organic group or a metal and where the compound as a whole does not comprise a metallic element which forms two or more stable chlorides.

14. A process of treating rubber which comprises incorporating with rubber an accelerator of vulcanization and dicyandiamide as an age-resister.

15. A process of treating rubber which comprises incorporating with rubber an age-resister compound having the general formula $R-S-C\equiv N$ where R is an organic group or a metal and where the compound as a whole does not comprise a metallic element which forms two or more stable chlorides.

16. A process of treating rubber which comprises incorporating with rubber prior to vulcanization an age-resister compound having the general formula $R-S-C\equiv N$ where R is an organic group or a metal and where the compound as a whole does not comprise a metallic element which forms two or more stable chlorides.

17. As a new composition of matter, latex containing as an age-resister a compound having the general formula $R-X-C\equiv N$ where X is N or an element of the sulphur group and R is an organic group or a metal and where the compound as a whole does not comprise a metallic element which forms two or more stable chlorides.

18. As a new composition of matter, latex containing dicyandiamide as an age-resister.

Signed at New York, county of New York, State of New York, this 27th day of December, 1926.

SIDNEY M. CADWELL.

Signed at New York, county of New York, State of New York, this 23rd day of December, 1926.

LUDWIG MEUSER.